UNITED STATES PATENT OFFICE.

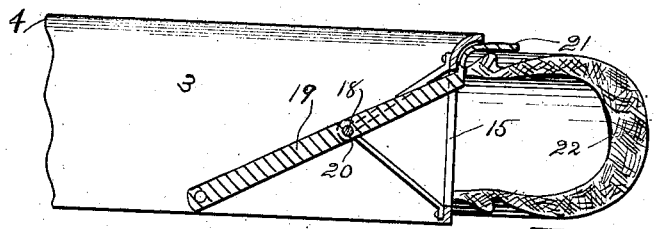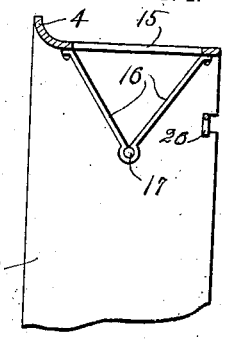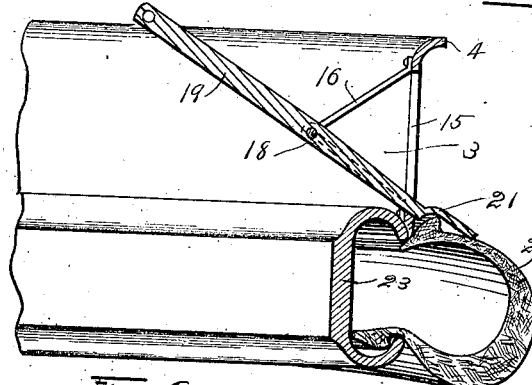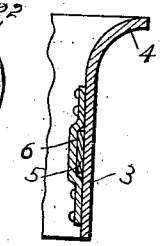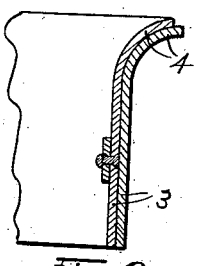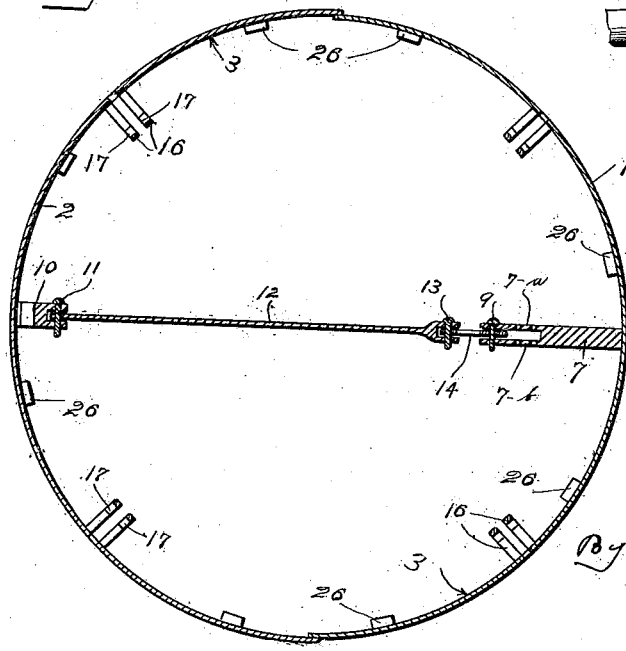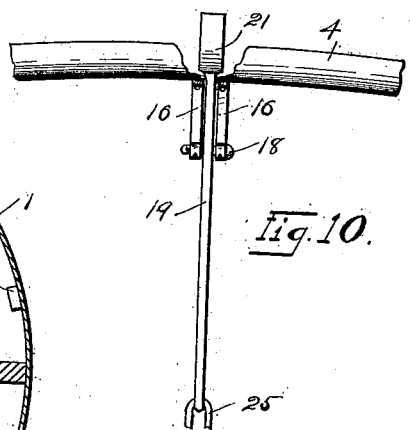

HARRY B. HARDY, OF QUINCY, CALIFORNIA.

RIM FOR MOUNTING TIRES.

1,377,343.

Specification of Letters Patent.

Patented May 10, 1921.

Application filed May 5, 1920. Serial No. 379,021.

*To all whom it may concern:*

Be it known that I, HARRY B. HARDY, a citizen of the United States, residing at Quincy, in the county of Plumas and State of California, have invented a new and useful Improvement in a Rim for Mounting Tires, of which the following is a specification, reference being had therein to the accompanying drawings.

My invention relates to a rim for mounting tires, adapted to assist the operator in mounting a tire on the wheel rim of an automobile.

An object of my invention is to provide a rim for mounting a tire on the regular wheel rim, that may be circumferentially contracted for the reception of a tire which may then be expanded to expand the tire to facilitate in transferring it to the wheel rim of the vehicle.

Further objects and purposes of the invention will appear as the description proceeds.

In the accompanying drawings—

Fig. 5 is a sectional view of a portion of the device on line $c$—$c$, Fig. 1, showing also a portion of an automobile tire.

Fig. 6 is a sectional view of a portion of the device on line $c$—$c$, Fig. 1, showing a sectional view of a portion of a clencher sectional view of a portion of a tire as it appears after it has been removed from the mounting rim to the wheel rim.

Fig. 7 is a view of a portion of the mounting rim on line $c$—$c$, Fig. 1, with the lever removed.

Fig. 8 is a sectional view of a portion of the rim on line $d$—$d$, Fig. 3.

Fig. 9 is a sectional view on line $e$—$e$, Fig. 3.

Fig. 10 is a plan view of a portion of the device.

Fig. 11 is a sectional plan view of the present invention.

Referring to the drawings in detail, throughout which like reference numerals designate like parts—

Figure 1:
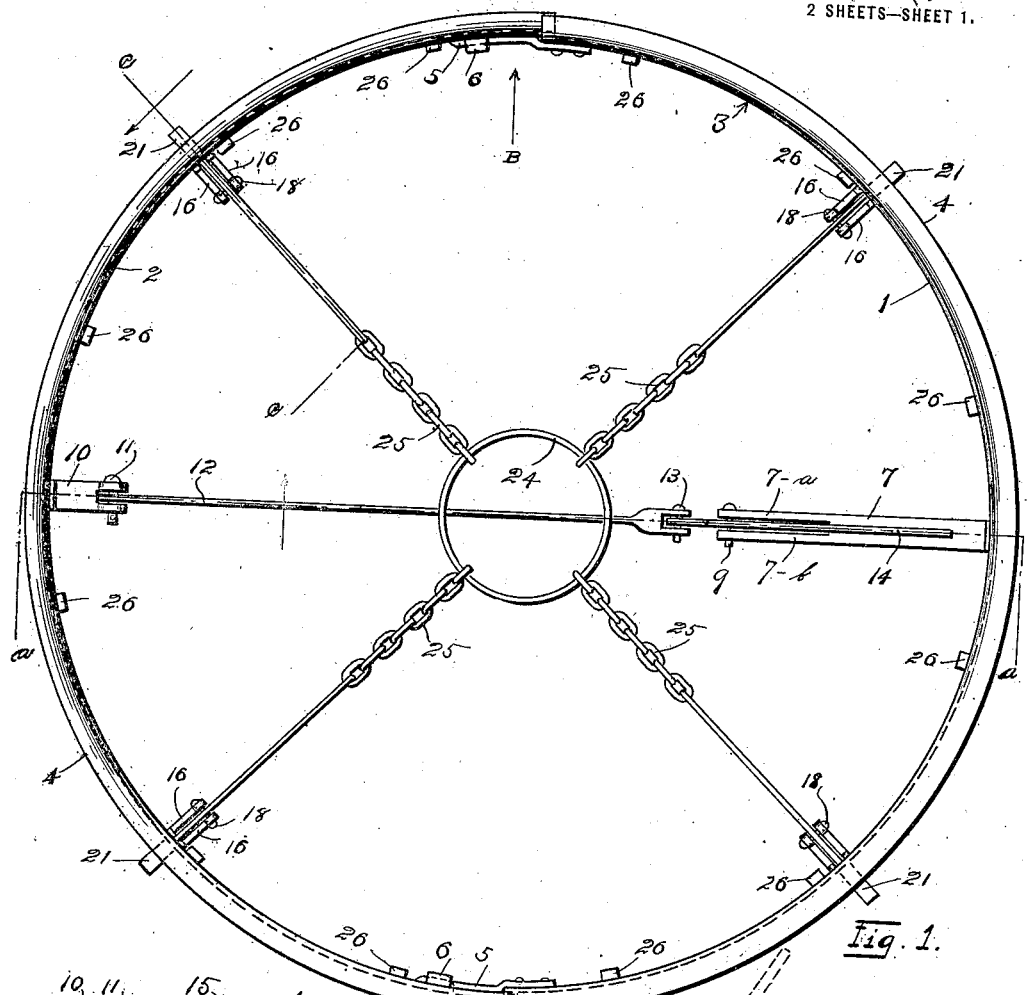
Figure 1 is a side elevation of my improved rim.
Figure 2:
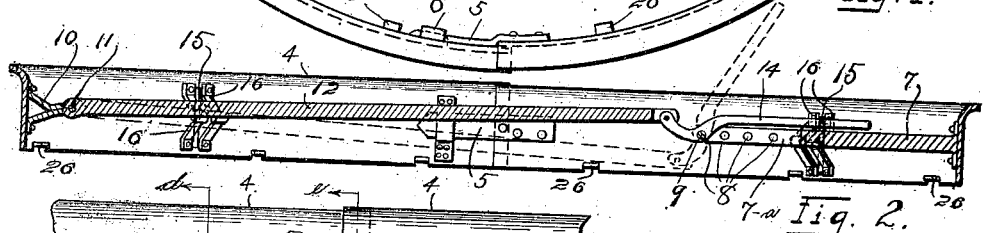
Fig. 2 is a sectional view on line $a$—$a$, Fig. 1, certain portions not being shown.
Figure 3:
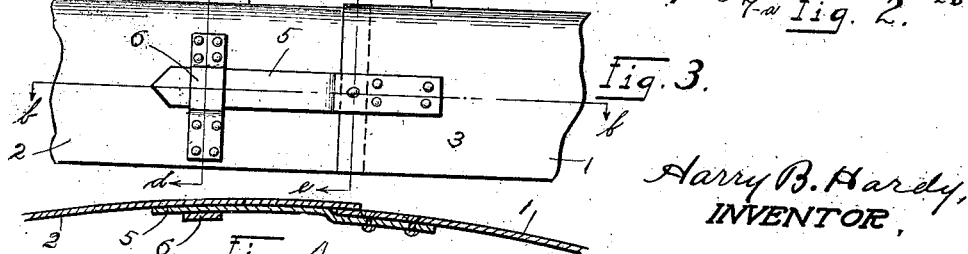
Fig. 3 is a fragmental view of the device looking in the direction indicated by the arrow B, Fig. 1.
Figure 4:
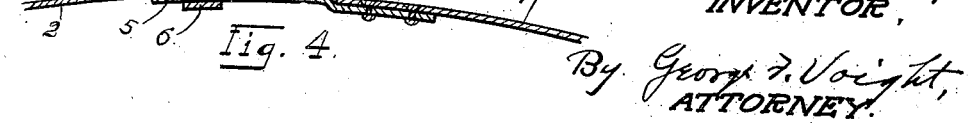
Fig. 4 is a sectional view on line $b$—$b$, Fig. 3.

The numeral 1 designates the right half or semi-circle, and the numeral 2 the left semi-circle, of a circular mounting rim 3, which is provided on one edge with a rolled flange 4.

The free ends of the member 1 are arranged to overlap the free ends of the member 2, and are provided with tongues 5, which project a distance out beyond the ends and engage loops 6 rigidly secured to the member 2 adjacent the free ends thereof.

On the inner side of the member 1, intermediate the ends thereof, is rigidly secured a bracket 7, which projects inwardly in a direction of the axis of the rim. The free end of the bracket is slotted, forming thereby a pair of laterally spaced apart arms $7^a$ and $7^b$. Said arms provided with a plurality of openings 8. The openings on one of said arms disposed in axial alinement with the openings in the opposite arm.

In one of the openings 8 of the arm $7^a$ is disposed a pivot pin 9, which pin also projects through the opening in the arm $7^b$ registering with the aforesaid opening.

10 designates a bracket rigidly secured to the inner side of the member 2 approximately equi-distant from its ends, having its free end bifurcated and provided with a pivot pin 11 which pivotally supports, intermediate its ends, one end of a connecting rod 12. The opposite end of said connecting rod is forked and supports a pin 13, which pivotally supports one end of an operating lever 14, which is fulcrumed intermediate its ends upon the pivot pin 9.

The arrangement of said brackets and levers being such that by rotating the lever 14 in the proper direction upon the pin 9 it will cause its inner or pivoted end to move to draw the connecting rod in a direction toward the bracket 7, which will cause the rim 3 to contract and the ends of the members 1 and 2 to slide alongside of each other, and the tongues 5 to slide through the loops 6.

When it is desired to contract the rim to a greater extent than the operation of the lever 14 normally permits, then the pivot pin 9 may be removed and disposed in other openings in the arms $7^a$ and $7^b$ of the bracket 7.

Extending through the sides of the rim 3, and spaced approximately equal distances apart and extending from a point upwardly adjacent the flange 4 to a point near the lower edge of the rim, are disposed four vertically extending slots 15, the functions of which will hereinafter be fully explained.

Upon the margins of the slots 15 are rigidly secured brackets 16, which are provided at their free ends with openings 17 supporting pivot pins 18 upon which are pivotally fitted the intermediate sections of levers 19 by means of openings, 20.

Outer portions of said levers are movable upwardly and downwardly in the slots 15 when the levers are rotated upon the pins 18.

The outer ends of the levers 19 are flattened and struck upwardly forming bowed fingers 21 adapted to operatively engage the sides of a tire 22. The convexed portion of the fingers are adapted to engage the lower concaved side of the flange 4 when the levers 19 are rotated as far as they will go in one direction upon the pin 18 (see Fig. 5), and are movable in a direction away from said flange when the levers are rotated in the opposite direction.

In Fig. 5 of the drawings is shown a tire 22 temporarily mounted on the rim 3, preparatory to permanently mounting it on a wheel rim 23.

In order to facilitate the operation of the levers 19 in the removal of the tire 22 from the rim 3 and mounting it on the rim 23, I provide a central ring 24 to which the inner ends of said levers are connected by means of chains 25. It is to be understood, however, that the ring 24 may be dispensed with, if so desired, and the inner ends of the chains 25 connected together by other suitable means.

26 designates a plurality of lips struck inwardly from the lower edge of the rim 3 and extend at right angles thereto. The functions of said lips are to form offsets adapted to engage one side of the wheel rim 23 to limit the movement of the first named rim over or onto said wheel rim.

It is to be understood that changes in the precise embodiment of the invention as described and illustrated, can be made within the scope of what is claimed without departing from the spirit of the invention.

What I claim as new and desire to secure by Letters Patent, is:

1. In a tire setter of the character described, a circular rim, means for contracting and expanding the rim, the rim provided with slots extending through from its inner to its outer periphery, and tire engaging levers having their intermediate portions pivotally supported by the rim and their outer ends movably disposed in said slots.

2. In a tire setter of the kind described, a rim comprising a pair of oppositely disposed semicircles disposed in the same plane, the free ends of one of the semicircles disposed in slidable engagement with the free ends of the other semicircle, the arrangement being such that the rim may be contracted by causing the free ends of one of said semicircles to slide in the proper direction along the free ends of the other semicircle, and means carried by said semicircles operable for causing said free ends to operatively slide.

3. In a tire setter, a rim comprising a pair of oppositely disposed semicircles disposed in the same plane and operatively movable toward each other for contracting the rim and movable away from each other for expanding the rim, and a lever having one end pivotally connected to an intermediate portion of one of said semicircles and an intermediate portion pivotally connected to an intermediate portion of the other of said semicircles, the arrangement being such that by moving said lever in one direction it will cause said semicircles to move relative to each other to expand the rim and by moving the lever in the opposite direction it will cause the semicircles to move to contract the rim.

In evidence that the foregoing is my own, I hereunto sign my name this 15th day of April, 1920.

HARRY B. HARDY.